США005681984A

United States Patent [19]

Cavestri

[11] Patent Number: 5,681,984
[45] Date of Patent: Oct. 28, 1997

[54] LEAK DETECTION IN HEATING, VENTILATING, REFRIGERATION, AND AIR CONDITIONING SYSTEMS UTILIZING ADSORPTIVE MATERIALS

[75] Inventor: Richard C. Cavestri, Columbus, Ohio

[73] Assignee: Bright Solutions, Inc., Troy, Mich.

[21] Appl. No.: 684,991

[22] Filed: Jul. 22, 1996

[51] Int. Cl.$^6$ ............................................. G01H 3/20
[52] U.S. Cl. ......................................................... 73/40.7
[58] Field of Search ............................... 73/40.7, 40.5 R; 62/77, 125; 252/68, 301.16, 964

[56] References Cited

U.S. PATENT DOCUMENTS

| | | | |
|---|---|---|---|
| 2,096,099 | 10/1937 | Gaugler | 73/40 |
| 3,770,640 | 11/1973 | Bartlett | 252/964 |
| 4,272,264 | 6/1981 | Cullen et al. | 210/282 X |
| 4,758,366 | 7/1988 | Parekh | 252/68 |
| 4,938,063 | 7/1990 | Leighley | 73/40.7 |
| 5,022,902 | 6/1991 | Juhl et al. | 210/282 X |
| 5,149,453 | 9/1992 | Parekh | 252/68 |
| 5,357,782 | 10/1994 | Henry | 73/40.7 |
| 5,421,192 | 6/1995 | Henry | 73/40.7 |
| 5,440,919 | 8/1995 | Cooper | 73/40.7 |

Primary Examiner—Hezron E. Williams
Assistant Examiner—Daniel S. Larkin
Attorney, Agent, or Firm—Robert J. Black

[57] ABSTRACT

A leak detecting dye for use in heating, ventilating, air conditioning, or refrigeration systems employing dyes such as naphthalimide, perylene, coumarin, anthracene, phenanthracene, and thioxanthane. The dye is adsorbed onto a non-absorbent carrier which is then adapted for inclusion into various components of the system such as a filter drier, or a desiccant container which may be inserted into appropriate locations within the system.

25 Claims, No Drawings

LEAK DETECTION IN HEATING, VENTILATING, REFRIGERATION, AND AIR CONDITIONING SYSTEMS UTILIZING ADSORPTIVE MATERIALS

BACKGROUND OF THE INVENTION

1. Field of the Invention

The present invention relates to detection of leaks in heating, ventilating, refrigeration, and air conditioning systems, and more particularly to dyes and the techniques for introducing them into such systems during their initial assembly, or any reassembly, permitting early detection of leaks, both initially and at some future time.

2. Background Art

A search of the background art directed to the subject matter of the present invention disclosed the following U.S. patents:

| U.S. PAT. NO. | INVENTOR | ISSUE DATE |
| --- | --- | --- |
| 2,096,099 | Gaugler | Oct 1937 |
| 3,234,045 | Larsen | Feb 1966 |
| 3,572,085 | Packo | Mar 1971 |
| 3,770,064 | Bartlett | Nov 1973 |
| 4,690,689 | Malcosky | Sep 1987 |
| 4,758,366 | Parekh | Jul 1988 |
| 5,149,453 | Parekh | Sep 1992 |
| 5,167,867 | Quaife at al | Dec 1992 |
| 5,279,967 | Bode | Jan 1994 |
| 5,357,782 | Henry | Oct 1994 |
| 5,421,192 | Henry | Jun 1995 |
| 5,440,919 | Cooper | Aug 1995 |

Based on a thorough review of the above identified patents, it is believed none of the above teach, disclose, or claim the novel combination of elements and functions found in the improved methods taught by the present invention.

Fluorescent leak detection dyes to find leaks in air conditioning systems have been in use since about 1984. Such systems are taught in the above-noted Parekh, Henry, and Cooper patents. Parekh teaches the use of perylene dyes in finding leaks in air conditioning systems that contain chlorofluorocarbon (CFC-12) refrigerant, while Henry is the first to teach the use of naphthalimide dyes in finding leaks in both CFC-12 and hydrofluorocarbon (HFC-134a) refrigerant and HVAC systems.

Cooper teaches and claims the placement of a dye for leak detection purposes on a substrate material capable of absorbing the leak detection additive. The dye is placed on the substrate and allows the additive to be absorbed into the substrate after which the substrate with the absorbed dye is installed into a component of the refrigeration system through which refrigerant circulates when the system is operated.

Most of these patents teach the use of fluorescent leak detection after the system has left the factory and is in use in the field. In the field it is possible to charge a system by a method of dye injection using the refrigerant as a vehicle for moving the dye into the system. Various types of injectors and mist diffusers exist for this purpose.

Yet another method of leak detection employed in aftermarket locations teaches the use of an electronic halogen detector. Electronic refrigerant leak detectors are presently also used in the vehicle assembly line to check for leaks in the air conditioning system. However, due to the inaccessibility of many fittings in the very limited time available to run the air conditioning system in a new automobile or truck assembly plant, and the possible existence of turbulence of air at the check site, this particular leak detection method fails to detect many leaks in the usual assembly line environment.

Thus, it can be obvious that a problem exists in the placement of suitable leak detection dyes into air conditioning systems at such time as the system or its components are assembled. If effective, filling during the assembly enables the air conditioning system to be tested for leaks to provide a quality assurance tool prior to shipment of the system, provided sufficient time is available to operate the system. It also facilitates checking the system later in the field for leaks without the need to recharge the system with additional refrigerant and dye. Thus, this arrangement would reduce the amount of refrigerant released into the atmosphere, providing an environmental benefit.

As noted above, it is possible to utilize dye injectors and mist diffusers to place appropriate dyes in an air conditioning system. However, in the production environment, several problems exist with this arrangement. Generally speaking, such methods are usually too time consuming for production purposes as they involve hooking up and then unhooking hoses to an air conditioning system while the system is on the assembly line. Secondly, such methods can be messy if there is a spillage, which is likely to occur under time constraints present in the usual assembly line environment. It has also been determined that such methods require the flow of the refrigerant through the injector and diffuser to propel the dye into the HVAC system. Finally, such methods would require modification of the existing vehicle assembly line refrigerant charge equipment to inject dye into the vehicle air conditioning system. Accordingly, vehicle and HVAC equipment manufacturers are looking for ways to insert dyes into an HVAC system, rapidly, cleanly, and without the need for the presence of refrigerant at the time of dye insertion.

Accordingly, the methods that are going to be described hereinafter for effecting introduction of leak detection dyes into HVAC systems were not taught previously for several reasons. One of these is the fact environmental awareness was not as prevalent in society while environmental legislation was in no way as stringent as is currently the case. Such restrictions have caused vehicle and HVAC equipment manufacturers to exhibit a far greater interest in limiting the number of leaks in their vehicles so as to reduce the amounts of refrigerant released into the atmosphere. The cost of refrigerants has risen dramatically over the past few years. In the past, it was relatively inexpensive to recharge or top off an air conditioning or HVAC system. This is no longer true because chlorofluorocarbon refrigerants, such as CFC-12 are in the midst of phase-out due to their high ozone depletion potential. Accordingly, they have been replaced by more ozone friendly refrigerants, such as HFC-134a (a hydrofluorocarbon refrigerant), which cost substantially more than the CFC-12 type refrigerants, based on costs of a few years ago. Subsequently, the CFC-12 refrigerant that is currently sold is substantially more expensive because of a federal tax imposed in conjunction with the phase-out of chlorofluorocarbons. Also, in order to prevent customer complaints which accompany the recharging of such HVAC systems with high priced refrigerants, vehicle manufacturers are doing their best to eliminate the need for recharging by reducing the number of leaks in the systems they manufacture.

It has also been found desirable to utilize a method of leak detection that does not require the air conditioning system or HVAC to be recharged prior to leak detection because the dye is already in the system from prior insertion at the time of the vehicle or HVAC equipment assembly.

Yet another reason is that automotive manufacturers currently have a much greater awareness of the necessity of providing customer satisfaction and reducing warranty costs. Manufacturers have continuously raised their standards for quality assurance and now desire to present as leak-free a system as possible to the consumer. Where such conditions are not possible, they consider it necessary to find the leak as quickly as possible once the vehicle is in the field. This desire comes not only from the automobile manufacturer, but also from the dealer networks that request that the fluorescent dye be active in the vehicle's air conditioning system when it leaves the factory.

A final reason for the utilization of this method of leak detection is the added prevalence of leaks due to the smaller molecular size of the HFC-134a refrigerant versus the previously utilized CFC-12.

Another approach to solving this particular problem involved the addition of ¼ ounce of perylene liquid dye into a desiccant container prior to its being installed in the air conditioning system accumulator. In such an arrangement, introduction of this dye was usually too messy. Accordingly, the object of the present invention is to present a satisfactory method for inserting the dye into an air conditioning, refrigeration, or other HVAC system at the point of manufacture.

SUMMARY OF THE INVENTION

Accordingly, it is the object of the present invention to provide an improved leak detection arrangement utilizing adsorptive materials that facilitates the HVAC and mobile air conditioning industries to find the existence of leaks in newly assembled or reassembled systems by inserting leak detection dyes into such systems or system components at the point of assembly. Insertion techniques, place and time and the properties of the dye are chosen and based on a number of different criteria and objectives, including cost, ease of insertion, cleanliness of handling, insertion time, capital equipment costs, material waste, impact on the environment, shelf life prior to insertion in the system, and chemical life once introduced into the system, as well as maximum duration and strength of leak detection capability in the system. Also of importance is the rate of dye dissolution into the HVAC refrigerant and lubricant combination with minimum contamination of the product prior to system insertion and maximum dye loading potentials important in the effective utilization of the teachings of the present invention.

Accordingly, the present system teaches a method of placing a leak detecting dye into a heating, ventilating, refrigeration, or air conditioning system. The system being of the type that employs a heat transfer agent, or in the alternative a refrigerant in a hermetic system chosen from the group comprising chlorofluorocarbons, hydrochlorofluorocarbons, hydrofluorocarbons and any hydrogen, halogenated or ether derivatives of methane hydrogen, halogenated ether or cyclic derivatives of either ethane, propane, butane, pentane, hydrocarbons, carbon dioxide, and ammonia.

The dye, by means of a method which will be described hereinafter, is introduced into the system. After this, the system is operated to allow the dye to circulate within the system.

After the dye has been allowed to circulate within the system, system components, joints, or attachments are examined with a light source having a light emission wavelength from 300 nanometers to 750 nanometers, after which the presence of a leak can be determined by the presence of a colored visual indication detectable under the light from the light source.

As used herein, the dye formulation consists of a dye chosen from the group including naphthalimide, perylene, coumarin, anthracene, phenanthracene, and thioxanthane dyes. The formulation can also be a combination of a liquid or powder dye with a lubricant, or a combination with a lubricant and a solvent. In any situation, depending upon the proportions, the dye formulation may be liquid, paste, or powder.

In the embodiments of the present invention taught herein, the dye formulation is added to a non-absorbent carrier which facilitates the introduction of the dye into the system by dissolution.

Adsorption is defined as "the surface retention of solid, liquid, or gas molecules, atoms, or ions by a solid or liquid, as opposed to absorption, the penetration of substances into the bulk of the solid or liquid". As can be seen from this definition, the concepts of adsorption and absorption are mutually exclusive.

By contrast, in the case of absorption, a substance penetrates the surface of the matter into which it is being absorbed. Engorgement of the surface of the absorbing material takes place. During the process of absorption, energy is transferred. An example of absorption is the transfer of energy from the exterior to the interior of a cell when water is absorbed into it.

In the case of adsorption, no penetration of the surface of another matter takes place. No engorgement of the surface of the adsorbing material takes place and there is no energy transfer. The one material is attracted to and held on the surface of another.

The carrier, which is of a non-absorbent substance, such as polyester, is able to support quantities of dye formulation, afterwards allowing quantities of dye into the system to facilitate finding any leaks within the system. The carrier is normally of a size and shape which facilitates dissolution of the dye and its introduction into the system.

In at least one embodiment of the present invention, the dye is adapted for application onto or inclusion into a desiccant container, receiver drier, filter drier, accumulator, or many other components of the heating, ventilating, refrigeration, or air conditioning system.

A technique will be described hereinafter in which the dye will be placed onto a fabric which will subsequently be fabricated into a desiccant container and then with desiccant beads included therein placed within the system. In another version which will be described herein, the desiccant container will be prefabricated and then the dye added to the completed container either externally or internally after fabrication.

In at least one embodiment of the present invention, the dye formulation is applied to a non-absorbent substrate to form a carrier which then may be introduced into the system. The carrier thus formed on the matrix facilitates dissolution and subsequent release into the system. While the carrier may be shaped into such shapes as spheres, discs, and similar surfaces which may have enhanced surfaces consisting of grooves, openings, etc., to facilitate maximum flow through, around or over the carrier when placed within the system.

It has also been found that in some situations the dye formulation can be caused to adhere to desiccant beads. The desiccant coated beads may be coated before or after insertion into a desiccant container. The container is then inserted into the system.

While the usage of dye coated desiccant beads appears to be highly desirable for inclusion into desiccant containers, it is also possible as noted above to employ techniques for introducing the dye directly onto the inside or outside of a desiccant container constructed of non-absorbent material, for insertion subsequently into the system.

DETAILED DESCRIPTION OF THE PREFERRED EMBODIMENTS

A best understanding of the present invention will be had by making reference to the following description, wherein will be described methods of placing a leak detecting dye in a heating, ventilating, refrigeration, or air conditioning system. Various means are taught for adapting the dye for introduction into the system, as well as various techniques for introducing the dye into the system, followed by examination of the system with a light source to determine the presence of a leak resulting from the presence of the dye at leak sites.

Initially, in preparation, a dye is chosen from the group comprising naphthalimide, perylene, coumarin, anthracene, phenanthracene, and thioxanthane dyes. While these dyes are available in both liquid and powder form, the powder form will be discussed initially since it is adaptable for preparation into a formula suitable for utilization in accordance with some of the teachings of the present invention.

When utilizing the dye powder, several techniques are available for preparing it into a formulation which is usable in accordance with the present invention. The first of these consists of applying the dye powder onto desiccant beads, or crushed granules of desiccant material, then heating the mix which results in the addition of a coating of dye onto the desiccant beads or granules. Alternately, the dye may be heated first to a molten state and then applied to the desiccant beads or granules. An effective manner of utilization of the coated desiccant beads is to insert them into an assembled or partially assembled desiccant container, which subsequently is inserted into the system.

A particularly desirable technique has been found to apply the dye to a non-absorbent fabric, such as polyester, and particularly such as polyethylene terephthalate (PET). For example, a desiccant container is made from non-woven mat (felt) polyester material. This material is made out of polyester strands which are in the shape of rods. The felt material takes the form of hills and valleys. If dye is placed in a liquid form on this material, the dye will be adsorbed onto it. The capillary action of the fiber matrix will hold the dye on the surface of the fiber in one or more of these hills or valleys.

In the case of the desiccant container material, the dye will be adsorbed regardless of whether it is in a solid, liquid, or molten form. For example, the molten form is obtained by heating naphthalimide dye powder to its melting point of approximately 130° C. It then flows like a liquid. After a few seconds the molten dye touching the container material will turn into a solid. This solid may be almost glass-like in nature. On cooling, the dye will adhere to the non-absorbent surface of the cloth to which the desiccant container is to be formed. The coated PET fabric may then be fabricated into a desiccant container for use within an air-conditioning or similar system. In another variation of the same system the container could be prefabricated and then the dye applied to the inside or outside of the previously fabricated desiccant container.

Another effective means for introducing the dye formulation into the system consists of preparing a dye formulation chosen from the group, outlined above, and applying the dye formulation into or onto a prepared non-absorbent carrier, using the technique of adsorption. Adsorption is defined as the taking up of one substance at the surface of another.

Tests based on extensive knowledge of organic and polymer chemistry have determined that no reaction occurs between the dye and a non-absorbent material utilized in accordance with the teachings of the present invention, such as polyethylene terephthalate (PET). Scientific tests have determined that no reaction occurs between the PET and the dye. In other words, dye molecules are adsorbed via van der Walls interaction and hydrogen bonding only, rather than being absorbed into the polymer.

Experiments were conducted in order to confirm the aforementioned conclusion by virtue of infrared spectroscopy and atomic force microscopy. Both experimental tests support the above conclusion. From the foregoing, it is clear that the most effective form of utilizing dyes for leak detection in heating, ventilating, refrigeration, and air conditioning systems is applying the dye onto the surface of a non-absorbent carrier of some form. As previously noted, in the case of adsorption, no penetration of the surface of another matter takes place. No engorgement of the surface of the adsorbing material takes place and there is no energy transfer. The material is attracted to and held on the surface of another.

The carrier is normally of an inert substance resistant to decomposition after introduction into the system in the presence of a refrigerant in combination with a lubricant and the dye. The carrier material, which can be a polyester or similar material, is non-absorptive. If liquid dye is used, it is applied directly to the carrier, while dye powder is heated before or after placement on the carrier (by heating jointly with the carrier, or placement on a preheated carrier) to a molten state and allowed to cool. When placed within the system, the carrier releases quantities of dye formulation into the system.

The carrier including the adsorbed dye formulation may be of a size and shape so as to facilitate its placement into a number of different components of the system.

It has been found that in selection of the appropriate material for the carrier, that it should, in addition to being non-absorbent, be inert when placed into the system and resistant to decomposition, so that any decomposition if and when it occurs causes no adverse effect to the performance or stability of any of the system components or the refrigerant or refrigerant lubricant. The shape of the carrier within the heating, ventilating, refrigeration, or air conditioning system facilitates in maximizing the rate of dye released into the system lubricant and refrigerant combination. The flow of the lubricant and refrigerant throughout the system encountering the dye formulation with sufficient flow moves the dye throughout the system to assist in leak detection.

The system components into which the carrier including the adsorbed dye formulation may be placed include a receiver drier, an accumulator, lines, compressor, heat exchangers, a filter drier, or a desiccant container if placed in the system prior to system assembly or reassembly.

The desiccant container with the included carrier may be placed within an accumulator, or a liquid line filter drier. Thus, again when the refrigerant, or a combination of refrigerant and lubricant passes over the carrier including the adsorbed dye formulation a certain amount of dye is transferred throughout the system and may be observed at the location of any leaks by examination with the presence of a light source having a light emission wavelength from 300 nanometers to 750 nanometers, which would then produce in the presence of a leak, a colored visual indication detectable under the light from the light source.

A number of different techniques are available for preparing the dye formulation for use in the present method of placing a leak detecting dye in the heating, ventilating, refrigeration, or air conditioning system in accordance with the teachings of the present invention. In those systems where a non-absorbent carrier is effectively utilized, the dye formulation which is applied into or onto the non-absorbent carrier may be prepared by choosing a liquid or powder dye from the group previously outlined.

In the foregoing, we have described a number of methods for preparing dye formulations from liquid or powder dye and introducing dye by various means into heating, ventilating, refrigeration, or air conditioning systems which employ a heat transfer agent, or in the alternative a refrigerant in a hermetic system chosen from the group comprising chlorofluorocarbons, hydrochlorofluorocarbons, hydrofluorocarbons, or any hydrogenated or other derivatives of methane, halogenated ether or cyclic derivatives of either ethane, propane, butane, pentane, hydrocarbons, carbon dioxide, and ammonia.

When the dye has been introduced into the system, and the system operated, examination of the system under a light source having light emission wavelength from 300 nanometers to 750 nanometers directed at the system can effectively determine the presence of any leaks by a colored visual indication detectable under the light from the light source.

While but several embodiments of the present invention have been shown, it will be obvious to those skilled in the art that numerous modifications may be made without departing from the spirit of the invention, which shall be limited only by the scope of the claims appended hereto.

What is claimed is:

1. A method of detecting leaks in a heating, ventilating, refrigeration, or air conditioning system using non-absorbent material as a carrier for a leak detecting dye, the method comprising the steps of:

preparing a dye formulation utilizing said leak detecting dye;

preparing a non-absorbent carrier;

said non-absorbent carrier is adapted for containing desiccant materials;

applying said dye formulation to said non-absorbent carrier;

adsorbing said dye formulation onto said non-absorbent carrier;

incorporating said non-absorbent carrier including said adsorbed dye formulation into said system;

operating said system to allow said dye formulation to circulate within the system;

examining the system with a light source having a light emission wavelength from 300 nanometers to 750 nanometers directed at said system, determining the presence of a leak by a colored visual indication detectable under the light from said light source.

2. The method as claimed in claim 1 wherein:
said non-absorbent carrier is a desiccant container.

3. The method as claimed in claim 1 wherein:
said dye formulation is applied to said non-absorbent carrier prior to its assembly into a desiccant container.

4. The method as claimed in claim 1 wherein:
said dye formulation comprises said dye chosen from a group comprising naphthalimide, perylene, coumarin, anthracene, phenanthracene, and thioxanthane.

5. The method as claimed in claim 1 wherein:
said dye utilized in preparing said dye formulation initially is in liquid form.

6. The method as claimed in claim 1 wherein:
said dye utilized in preparing said dye formulation initially is in powder form.

7. The method as claimed in claim 1 wherein:
said dye formulation is heated to a molten state prior to application to said non-absorbent carrier.

8. The method as claimed in claim 6 herein:
said non-absorbent carrier is heated prior to application of said dye formulation.

9. The method as claimed in claim 6 wherein:
said non-absorbent carrier and said dye formulation are heated after said dye formulation is applied to said non-absorbent carrier.

10. The method as claimed in claim 1 wherein:
said non-absorbent carrier is a polyester material.

11. The method as claimed in claim 1 wherein:
said non-absorbent carrier is constructed of polyethylene terephthalate (PET).

12. The method as claimed in claim 1 wherein:
said system employs a heat transfer agent, or in the alternative a refrigerant in a hermetic system, chosen from a group comprising chlorofluorocarbons, hydrochlorofluorocarbons, hydrofluorocarbons and any hydrogen, halogenated or ether derivatives of methane, halogenated ether or halogenated cyclic derivatives of either ethane, propane, butane, pentane, hydrocarbons, carbon dioxide, and ammonia.

13. The method as claimed in claim 12 wherein:
said carrier is an inert substance resistant to decomposition after introduction into said system in the presence of said refrigerant in combination with a lubricant and said dye formulation.

14. The method as claimed in claim 13 wherein:
said carrier is of a size to facilitate placement into or in the alternative onto at least one component of said system.

15. The method as claimed in claim 1 wherein:
said carrier is constructed of a material inert when placed in said system.

16. The method as claimed in claim 14 wherein:
said carrier is resistant to decomposition, whereby any of said decomposition causes no adverse effect to the performance or stability of any of said system components, of said refrigerant or any refrigerant lubricant.

17. The method as claimed in claim 1 wherein:
the form of said carrier including said adsorbed dye formulation facilitates in maximizing the rate of said dye formulation released into said system.

18. The method as claimed in claim 1 wherein:
said non-absorbent carrier is a component of said system.

19. The method as claimed in claim 1 wherein:
said desiccant container including said dye formulation may be placed in a component of said heating, ventilating, air conditioning, or refrigeration system selected from a group including an accumulator, a receiver drier, and a filter drier.

20. The method as claimed in claim 13 wherein:

said placement of said carrier including said adsorbed dye formulation in said system component encounters the flow of both lubricant and refrigerant with sufficient flow to move said dye formulation within the system so as to effect leak detection.

21. The method as claimed in claim 1 wherein:

molecules of said dye formulation are retained on said non-absorbent carrier surface by adsorption.

22. The method as claimed in claim 1 wherein:

incorporation of said non-absorbent carrier into said system occurs prior to the application of said dye formulation to said non-absorbent carrier.

23. The method as claimed in claim 1 wherein:

incorporation of said non-absorbent carrier into said system occurs after the application of said dye formulation to said non-absorbent carrier.

24. The method as claimed in claim 1 wherein:

said carrier including said adsorbed dye formulation operates to release quantities of said dye formulation into said system to facilitate the finding of leaks within said system.

25. The method as claimed in claim 1 wherein:

said non-absorbent carrier and said dye formulation are united by adsorption wherein capillary action of said non-absorbent carrier maintains said dye formulation on the surface of said non-absorbent carrier.

* * * * *